United States Patent [19]

Grigsby

[11] Patent Number: 5,623,266

[45] Date of Patent: Apr. 22, 1997

[54] CONTIGUOUS SUBCARRIER BARRAGE JAMMING METHOD AND APPARATUS

[75] Inventor: John L. Grigsby, Los Altos, Calif.

[73] Assignee: The United States of America as represented by the Secretary of the Air Force, Washington, D.C.

[21] Appl. No.: 721,125

[22] Filed: Apr. 12, 1968

[51] Int. Cl.$^6$ ............................. G01S 7/38; H04K 3/00
[52] U.S. Cl. ....................................................... 342/14
[58] Field of Search .................... 343/18 E, 14; 342/13, 14

[56] References Cited

U.S. PATENT DOCUMENTS

| | | | |
|---|---|---|---|
| 2,412,991 | 12/1946 | Labin | 342/14 X |
| 2,658,992 | 11/1953 | Byrne | 342/14 X |
| 2,671,896 | 3/1954 | De Rosa | 342/168 |
| 3,044,061 | 7/1962 | Richmond et al. | 342/15 |
| 3,188,635 | 6/1965 | Blythe | 342/111 |
| 3,195,130 | 7/1965 | Adrian | 342/145 |
| 3,604,828 | 9/1971 | Wilson et al. | 342/14 X |
| 3,624,652 | 11/1971 | Haeff | 342/14 |
| 3,670,333 | 6/1972 | Winn | 342/14 |
| 3,699,575 | 10/1972 | Peters, Jr. et al. | 342/14 |
| 3,720,944 | 3/1973 | Kramer et al. | 342/14 |
| 3,806,925 | 4/1974 | Cuthbert | 342/14 |
| 3,806,926 | 4/1974 | Page | 342/14 |
| 3,879,732 | 4/1975 | Simpson | 342/14 |
| 3,896,439 | 7/1975 | Lester et al. | 342/14 |
| 3,955,200 | 5/1976 | Miller | 342/14 |
| 4,149,167 | 4/1979 | Peters, Jr. et al. | 342/14 |
| 4,217,550 | 8/1980 | Blassel et al. | 342/14 X |
| 4,264,909 | 4/1981 | Hamilton et al. | 342/13 |

*Primary Examiner*—John B. Sotomayor
*Attorney, Agent, or Firm*—William G. Auton

[57] ABSTRACT

A method and apparatus for providing a radar jamming signal by simultaneously frequency-modulating a voltage-tunable oscillator with a large-amplitude, periodic, sawtooth waveform and a small-amplitude random waveform. The periodic, sawtooth modulation produces a series of radio frequency spectral lines (subcarriers) of nearly uniform amplitude over a frequency range proportional to the peak-to-peak sawtooth amplitude. The spacing between adjacent subcarriers is equal to the fundamental sawtooth frequency. The secondary random modulation added to the primary sawtooth modulation produce simultaneous, random, frequency modulation of each of the subcarriers created by the primary modulation.

1 Claim, 3 Drawing Sheets

CONTIGUOUS SUBCARRIER BARRAGE JAMMING METHOD AND APPARATUS

BACKGROUND OF THE INVENTION

This invention relates to a radar deception jammer method and apparatus and more particularly an FM barrage jamming method and apparatus which include simultaneously frequency-modulating a voltage tunable oscillator with a large-amplitude, periodic, sawtooth waveform and a small-amplitude, random waveform to provide a radar Jamming signal.

An antijamming device that is finding increasing application in modern radar is the Dicke-Fix receiver. The Dicke-Fix receiver consists of a wideband RF/IF portion, followed by a limiter, which in turn is followed by a narrowband IF amplifier. The pre-limiter gain is such that the limiter limits on receiver self-noise alone. This receiver, in its original form, is designed to counter sweep-frequency jamming. It has also been possible to adapt the Dicke-Fix to provide a constant-false-alarm-rate (CFAR) receiver for automatic detection/processing equipment. This constant-false-alarm-rate feature is essential to prevent overloading the automatic detection/processing system with false alarms in the presence of noise jamming. The CFAR feature is also used, for much the same reason, in human/PPI (manual detection) systems.

Under certain circumstances the CFAR property of the Dicke-Fix receiver can be defeated by barrage jamming. That is, a particular form of barrage can introduce false alarms into the system over a moderate range of Dicke-Fix receiver parameters. When some of the characteristics of the victim Dicke-Fix are correctly inferred, the barrage may be designed for maximum effectiveness. Such a barrage may well be more effective than white gaussian noise because of its potential ability to saturate automatic detection/processing systems and because of its ability to introduce confusing effects into manual detection systems.

The present invention provides such a barrage jamming which is referred to as Contiguous Subcarrier Barrage (CSB). The CSB is designed to be simultaneously effective against both Dicke-Fix and conventional receivers.

in addition to overcoming the CFAR property of a Dicke-Fix receiver, the CSB jamming technique is also able to suppress the radar target-echo signal (as would white gaussian noise or a suitable fast-sweep jammer). These two effects, signal suppression and false-alarm generation, should not only be effective against an automatic detection system, but also against a manual/PPI detection system utilizing a Dicke-Fix receiver. In some cases target detection in either an automatic or a manual system may be prevented by the false receiver responses alone, even though the jammer power is insufficient to suppress the target echo completely.

When a Dicke-Fix is not employed, the signal suppression effect does not occur. However, given a PPI or other intensity-modulated display, the CSB is capable of producing enough false responses in a conventional receiver to obscure the target. It is predicted, however, that the CSB will not be capable of producing a sufficient number of false responses to Jam effectively a conventional receiver with an A-scope display. Thus, the CSB is not considered suitable for jamming tracking radars.

Some clarification in the usage of the terms "false response" and "false alarm" is in order. A false response can be generated each time a subcarrier sweeps through the Dicke-Fix post-limiter passband. A single false response is seldom mistaken for a target; i.e., a false response does not, in general, constitute a false alarm. As used here, a false alarm consists of a number of false responses which, following integration or some other form of processing, appear to be a legitimate target. A false response is defined on the following basis. Assume that the only signal at the receiver input is noise (self-noise and/or jamming). This noise is detected and appears in the video portion of the receiver system, in which a threshold-voltage level has been previously set. If, during a time interval equal to the radar's pulse width, the video noise voltage exceeds the threshold value, a false response is said to have occurred. Normally, a number of false responses are required to meet some detection criterion before a false alarm (false target) is declared to be present. In automatic detection systems, the detection criteria are known and one may therefore estimate the false-alarm probabilities, knowing the false-response probabilities.

Using maximum false-response probability as a criterion, the optimum bandwidth for the secondary random (noise) modulation for the CSB has been determined. This bandwidth is a relatively noncritical function of the signal bandwidth of the victim radar.

SUMMARY OF THE INVENTION

The CSB Jamming signal is generated by simultaneously frequency-modulating a voltage-tunable oscillator with a large-amplitude, periodic, sawtooth waveform and a small-amplitude, random waveform. The periodic, sawtooth modulation produces a series of RF spectral lines (subcarriers) separated in frequency by an amount equal to the fundamental sawtooth frequency. The effect of adding a secondary random modulation to the primary sawtooth modulation is to produce simultaneous, random, frequency modulation of each of the subcarriers created by the primary modulation. Unlike many of the newest barrage jamming techniques, the CSB uses low-frequency, low pass noise for its secondary modulation. Typical noise bandwidths range from 80 to 200 kc. The amplitude of the secondary modulation is adjusted to the minimum value required to produce a nearly uniform power spectral density across the barrage.

An object of the present invention is to provide a method and apparatus for producing a contiguous subcarrier barrage signal for jamming radars.

Another object of the present invention is to provide a radar jamming method and apparatus which includes simultaneously frequency-modulating an oscillator with a large-amplitude sawtooth waveform and a small-amplitude, random waveform to provide a jading signal.

The various features of novelty which characterize the invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

DESCRIPTION OF THE PREFERRED EMBODIMENT

Figure 1:
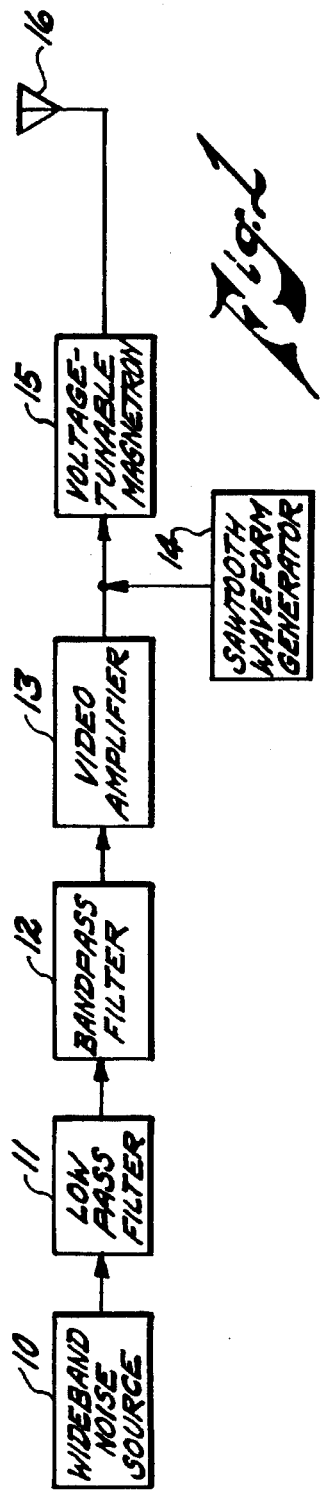
FIG. 1 shows a block diagram of a preferred embodiment of the invention.

Now referring to FIG. 1, there is shown conventional voltage-tunable magnetron 15 which in this instance is an S-band oscillator. However, it is noted any voltage-tunable oscillator of sufficient power and frequency suitable for radar utilization may also be employed. The contiguous subcarrier barrage signal is generated by simultaneously frequency-modulating voltage-tunable magnetron 15 with a large, periodic sawtooth waveform provided by sawtooth waveform generator 14 and a small-amplitude, random waveform provided by the combination of wideband source 10, low pass filter 11, bandpass filter 12, and video amplifier 13. Wideband source 10 may be a Burroughs Beam switching tube. Low pass filter 11 has a bandwidth of 350 kc. hand pass filter is designed to operate between 200 cps to 110 kc. The aforementioned combination provides band pass gaussian noise as the aforementioned random waveform. Sawtooth waveform generator 14 is adjustable in frequency and amplitude. It is to be noted that any conventional noise generator may be utilized and the output added to the sawtooth waveform to provide resultant waveform to frequency-modulate an oscillator.

Figure 2:
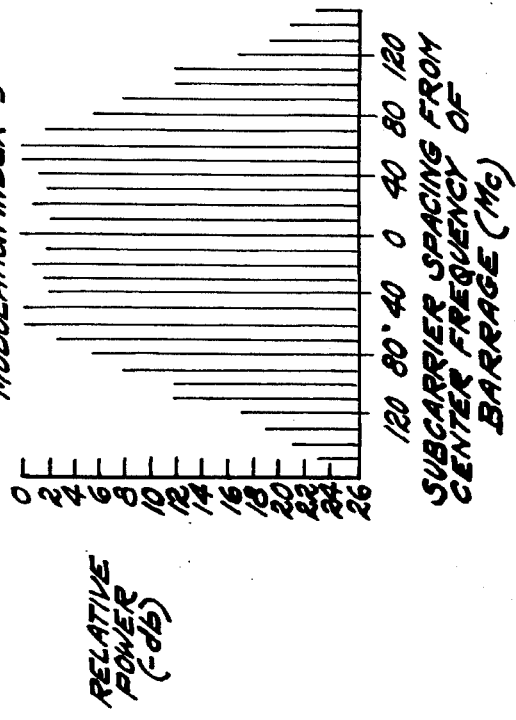
FIG. 2 shows a series of spectral lines (subcarriers) resulting from the periodic sawtooth modulation of the voltage controlled oscillator of FIG. 1.

The periodic, sawtooth modulation produces a series of RF spectral lines (subcarriers) of nearly uniform amplitude over a frequency range proportional to the peak-to-peak sawtooth amplitude as illustrated in FIG. 2. The spacing between adjacent subcarriers is equal to the fundamental sawtooth frequency, which is ideally chosen to be about equal to the expected pre-limiter bandwidth of the victim Dicke-Fix receiver. When this is the case, a single subcarrier will be accepted by a receiver tuned to any frequency within the range swept by the jammer; each subcarrier may be considered to be a simple sinusoidal signal.

Figure 3:
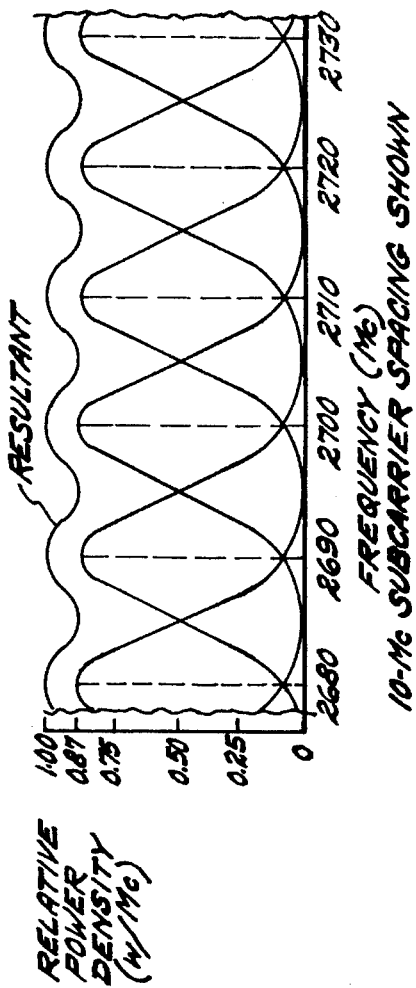
FIG. 3 shows a section of RF spectrum resulting from a contiguous array of equal-power subcarrier frequency-modulated with gaussian waveform as provided for by the apparatus of FIG. 1.
Figure 4:
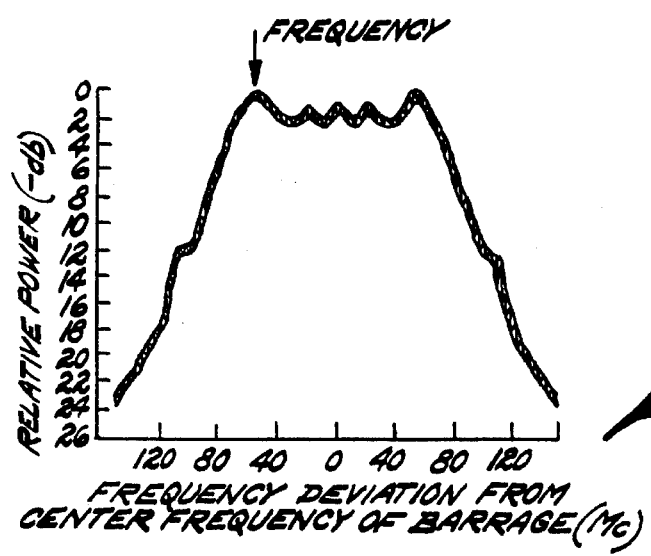
FIG. 4 shows the Contiguous Subcarrier Barrage power spectral density produced by simultaneous sawtooth and noise FM of the voltage-tunable magnetron of FIG. 1.

The effect of adding a secondary random modulation to the primary sawtooth modulation is to produce simultaneous, random, frequency modulation of each of the subcarriers created by the primary modulation. The amplitude of the secondary modulation is normally adjusted to just "fill in" the gaps between the subcarriers, as shown in FIG. 3, producing a continuous power spectrum, as illustrated in FIG. 4, between the frequency limits determined by the amplitude of the primary modulation.

The output (jamming) signal from voltage-tunable magnetron 15 is transmitted by way of antenna 16 for jamming purposes.

In order to appreciate the effect of contiguous subcarrier barrage jamming on a Dicke-Fix receiver, consider first the effect of a single, CW, sinusoidal Jamming signal at some frequency within the Dicke-Fix pre-limiter bandwidth B but not within the narrower post-limiter bandwidth b. This Jamming signal causes the same effect in the Dicke-Fix receiver as does a single, unmodulated subcarrier produced by the contiguous subcarrier barrage primary sawtooth modulation; if it is strong enough it will "capture" the limiter continuously, severely suppressing both the receiver noise and the target-echo pulses at the receiver output. Since the jamming signal does not fall within the narrow post-limiter passband, however, no Jammer energy appears at the receiver output.

Figure 5:
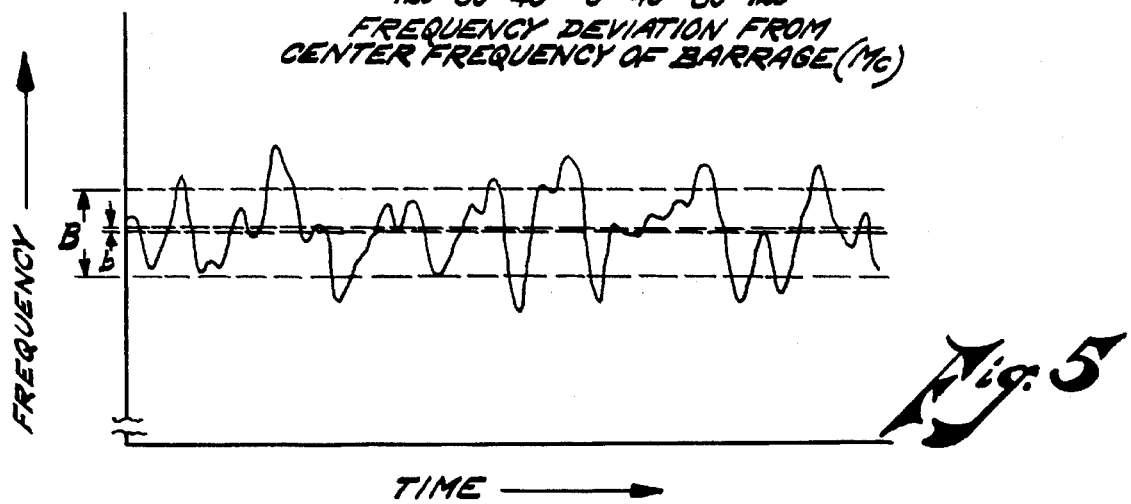
FIG. 5 shows the instantaneous frequency of a single, randomly frequency-modulated sinusoid in the region of Dicke-Fix passbands.
Figure 6:
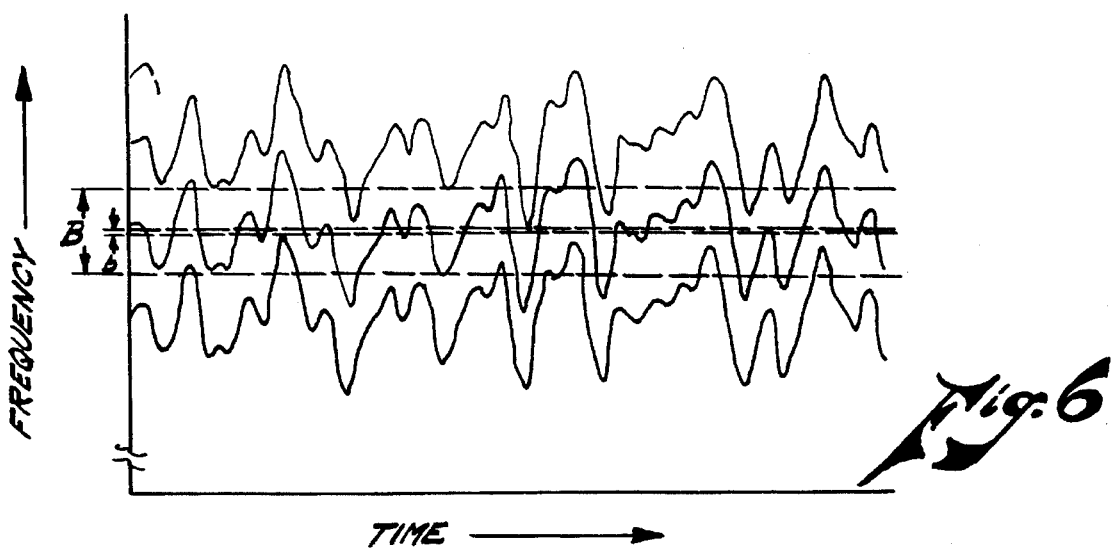
FIG. 6 is a section of the barrage, showing instantaneous frequency of several contiguous frequency-modulated subcarriers in the region of Dicke-Fix passbands.

Now suppose that this CW jamming signal (which has captured the limiter) is frequency modulated at a moderate rate over a range approximately equal to the pre-limiter bandwidth (FIG. 5). Each time this signal enters or passes through the post-limiter IF passband, a response occurs at the receiver output. Whenever the jamming signal remains within the post-limiter passband for a time approximately equal to or greater than 1/b sec, the response generated is nearly equal to the maximum possible target-echo-pulse amplitude. Thus, this form of modulated CW spot jamming is capable of defeating the CFAR property of the Dicke-Fix, as well as continuously suppressing the target-echo pulse at the receiver output. In the contiguous subcarrier barrage technique a large number of these spot-jammers (in the form of frequency-modulated subcarriers) are precisely arranged, in a contiguous fashion, to produce a barrage as illustrated in FIG. 6.

Figure 7A:
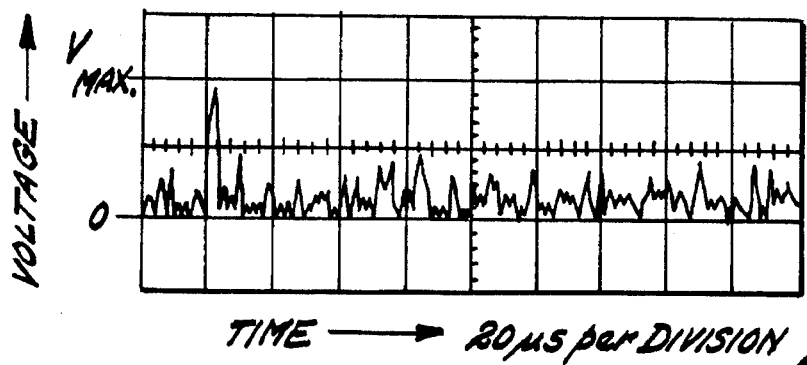
FIG. 7a shows video voltages against time for a Dicke-Fix receiver with target pulse and receiver noise in clear (no jamming) environment.
Figure 7B:
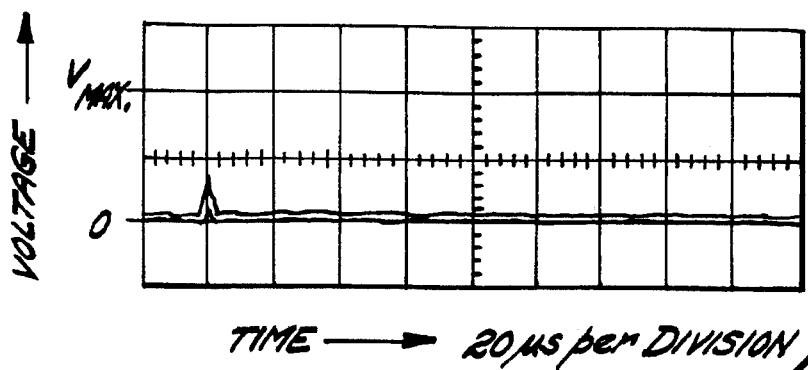
FIG. 7b shows video voltages against time for a Dicke-Fix receiver with suppression of target pulse and receiver noise by single contiguous subcarrier barrage subcarrier within prelimiter bandwidth B.
Figure 7C:
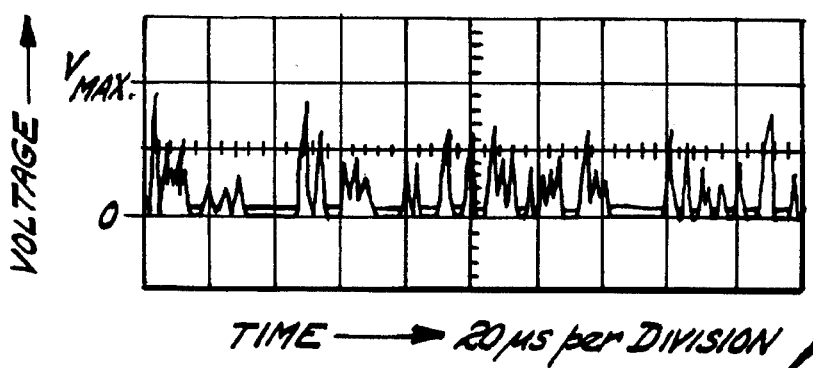
FIG. 7c shows video voltages against time for a Dicke-Fix receiver with false responses resulting from application of secondary noise modulation to contiguous subcarrier barrage subcarriers.

The behavior of one CFAR Dicke-Fix configuration (B=11 mc, b=0.4 mc) in the presence of CSB Jamming is shown in FIGS. 7a, 7b, and 7c. In all three the location of the simulated target-echo pulse is the same, centered on the first major division (from the left) of the graticule.

In FIG. 7a, the target pulse (of duration 1/b sec) and receiver noise are shown in a clear (no-jamming) environment. The peak power of the target pulse (16 db above the minimum detectable signal level of the receiver) is more than sufficient to produce the maximum receiver output $V_{max}$ allowed by the limiter.

The second FIG., 7b, shows the Dicke-Fix output with a single, unmodulated subcarrier of the barrage present within the pre-limiter bandwidth B but outside of the post-limiter bandwidth b. The power of this CW subcarrier is such that, when the secondary noise modulation is applied to the subcarriers, the average Jamming power within the narrow bandwidth b is equal to the peak target-pulse power. Both the target pulse and the receiver noise are seen to be suppressed by the CW subcarrier, although with this moderate ratio of jamming power to peak target-pulse power, the target pulse is still apparent.

The S/N ratio in FIG. 7b has not deteriorated significantly, so the original signal voltage (as well as noise) can be recovered by additional amplification in the post-limiter portion of the Dicke-Fix. This additional amplification is often automatically provided by fast-acting logarithmic IF (as in the Dicke-Fix/Log receiver combination). However, when false responses are created, the signal voltage cannot be recovered without at the same time increasing the amplitude of the false responses.

in FIG. 7c, the secondary frequency modulation (low pass gaussian noise, bandwidth =110 kc) has been applied, with all other conditions remaining the same as in FIG. 7b. A relatively large number of Jamming responses is created in the receiver output, many of them significantly exceeding the receiver self-noise (FIG. 7a) in amplitude and approximating the target pulse in duration. These large responses would not be produced by DINA or conventional FM barrage jamming.

The effectiveness of the contiguous subcarrier barrage technique arises from the fact that each subcarrier created by the primary modulation needs to be swept over only a relatively small frequency range, yet a continuous barrage over several hundred megacycles is still maintained. Because of the small frequency range swept by each subcarrier, the random frequency modulation of the subcarriers may be accomplished at a fairly rapid rate (but still slowly enough to allow the post-limiter filter to respond), thereby producing a large number of high-amplitude false responses in a Dicke-Fix receiver tuned to any frequency within the barrage.

In a typical instance of jamming a CFAR Dicke-Fix receiver whose pre-limiter bandwidth is in the neighborhood of 10 mc, the period of the primary sawtooth modulation waveform is approximately 1/10 sec. The sawtooth amplitude is adjustable over a range sufficient to produce a barrage up to 200 mc. This barrage may be centered at frequencies ranging from about 2400 mc to 3100 mc. The secondary modulation waveform, band pass gaussian noise, may be in the range of 200 cps to 110 kc. The bandwidth of the secondary-modulation is not optimized but is instead suitable for jamming a moderate range of post-limiter Dicke-Fix bandwidths. There is an optimum bandwidth for modulating low pass noise, which depends on the subcarrier spacing (which is known) and the post-limiter bandwidth of the victim Dicke-Fix receiver. Wide variations from the optimum can be tolerated, however, with relatively small effect. Since both post-limiter bandwidth and the bandwidth of a conventional radar receiver are determined by the radar's transmitted spectrum, measurement of this spectrum enables a suitable modulating noise bandwidth to be chosen.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases, certain features of the invention may be used to advantage without corresponding use of other features.

Having now described my invention, what I claim as new and desire to secure by Letters Patent is as follows:

1. An apparatus to Jam preselected radar receivers comprising a voltage-tunable oscillator, means to generate a noise signal, first means to low pass filter said noise signal, second means to bandpass filter the low pass filtered signal, means to video amplify the bandpass signal at a predetermined magnitude, the combination of said noise generator, said first low pass filter, and said second bandpass filter and said video amplifier providing a predetermined small-amplitude random waveform, means to generate a predetermined large amplitude, periodic sawtooth waveform of a preselected fundamental frequency, a voltage-tunable magnetron being simultaneously modulated by said predetermined, small-amplitude random waveform and said predetermined large amplitude waveform, said predetermined large amplitude waveform contributing a series of subcarriers of nearly uniform amplitude over a frequency range proportional to the peak-to-peak sawtooth amplitude with the spacing between adjacent subcarriers being equal to said fundamental sawtooth frequency, said predetermined small-amplitude random waveform contributing random frequency modulation of each of said subcarriers with the predetermined small-amplitude of said random waveform being selected to Just fill in the gaps between said subcarriers to produce a continuous power spectrum between the frequency limits determined by the amplitude of the sawtooth modulation spectrum, and means to direct the output of said voltage-tunable magnetron toward said preselected radar receivers to be jammed.

\* \* \* \* \*